(12) United States Patent
DeLacroix et al.

(10) Patent No.: US 6,450,226 B2
(45) Date of Patent: Sep. 17, 2002

(54) COMMERCIAL VEHICLE WHEEL WITH VALVE EMERGING OUTSIDE THE DISK

(75) Inventors: Serge DeLacroix, Chamalieres; Sylvain Giraud, Royat, both of (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/731,610

(22) Filed: Dec. 7, 2000

(Under 37 CFR 1.47)

(30) Foreign Application Priority Data

Dec. 9, 1999 (FR) .............................. 99 15790
May 3, 2000 (FR) ............................. 00 05742

(51) Int. Cl.⁷ ............................................. B60C 29/02
(52) U.S. Cl. ...................... 152/427; 152/384; 301/5.24; 301/95.101
(58) Field of Search ................. 301/5.24, 63.101, 301/95.101; 152/379.3, 379.4, 381.3, 381.4, 384, 427, 428

(56) References Cited

U.S. PATENT DOCUMENTS

| 4,453,776 | A | * | 6/1984 | Rohr |
| 5,788,334 | A | | 8/1998 | Renard ..................... 301/5.24 |
| 5,958,160 | A | * | 9/1999 | Botte |

FOREIGN PATENT DOCUMENTS

EP 701911 3/1996

* cited by examiner

*Primary Examiner*—Russell D. Stormer
(74) *Attorney, Agent, or Firm*—Baker Botts LLP

(57) ABSTRACT

A commercial vehicle wheel with valve emerging outside the wheel disk and having a safety element on the outside of the rim, the safety element consisting of a cylindrical wall of axial width p, so that, Φ being the standard diameter of the wheel, there is the relationship:

$$10 \leq p/\Phi \times 1000 \leq 35.$$

5 Claims, 3 Drawing Sheets

COMMERCIAL VEHICLE WHEEL WITH VALVE EMERGING OUTSIDE THE DISK

BACKGROUND OF THE INVENTION

The invention concerns the sheet metal wheels of commercial vehicles equipped with valves for the inflation of tires, particularly those equipped with circumferential groove mounting rims and the valve of which emerges outside the wheel disk.

An example of a wheel of this type is described in patent EP 0 701 911 B1. That wheel comprises a disk and a rim with an outer hook, an outer seat, a safety element, a first connecting area where a valve hole is placed, a second roughly cylindrical connecting area, a circumferential mounting groove with an outer flange and an inner flange, an inner seat and an inner hook, the connection between the disk and the rim being made in the second connecting area, the diameter of which is greater than that of the mounting groove, in which the safety element consists of a circumferential boss or "hump".

That wheel has the advantage of having a valve which does not enter the inner space of the wheel disk. It does, however, entail difficulties with mountings and demountings of the tires it is intended to receive.

On mounting of a tire, after having introduced the two beads in the mounting groove, the outer bead of the tire must pass over the hump in order to reach its position on the outer seat. By reason of the large diameter of the hump, that passage must take place in several successive stages. The tire bead is first passed over the hump area close to the valve. Then the tire is inflated and the internal pressure ensures complete passage of the bead over the hump and it is set in place on the outer seat. That application of pressure from the internal cavity of the tire is not possible when the outer bead has not crossed the valve base. It is therefore necessary to define a particular operating procedure for those wheels.

Crossing of the hump in several stages can also be the cause of an irregular placement of the outer bead on the outer rim seat, which can cause a rolling unbalance.

On demounting of the tires, it is also necessary to observe a particular operating procedure with specific tools in order to be able to pass the outer bead of the tire without risk of damaging it through excessive stresses, notably, on crossing of the valve area.

Those problems are very significantly improved by the wheel according to the invention.

SUMMARY OF THE INVENTION

The term "commercial vehicle wheel" herein is understood to mean a wheel of diameter greater than or equal to 17.5 inches (444.5 mm). "Axial direction" means a direction parallel to the axis of rotation of the wheel.

The wheel according to the invention comprises:
a disk, and
a rim with an outer hook, an outer seat, a safety element, a first connecting area in which a valve hole is placed, a second connecting area, a circumferential mounting groove with an outer flange and an inner flange, an inner seat and an inner hook, the connection between said disk and said rim being made in said second connecting area, the diameter of which is greater than that of said mounting groove.

That wheel is characterized in that the safety element consists of a cylindrical wall or ledge of diameter identical to that of the inner end of the outer seat and in that, $\Phi$ being the diameter of the wheel and $p$ the axial length of the cylindrical wall, $$10 \leq p/\Phi \times 1000 \leq 35$$

According to an advantageous embodiment:

$$12 \leq p/\Phi \times 1000 \leq 26$$

According to another characteristic, $\emptyset$ being the diameter of the radially outer wall of the ledge, the result is:

$$\emptyset/\Phi \geq 0.96$$

It is, in fact, preferable, in order to maintain the unseating prevention performance of the safety elements of the wheels according to the invention, to have the diameter of the radially outer wall of the ledge as close as possible to the diameter $\Phi$ of the wheel.

The wheels according to the invention preferably have a width greater than or equal to 5.25 inches (133.5 mm).

That wheel has the advantage of presenting a device to prevent unseating of the outer bead of the tire, called a ledge, as efficient as the hump of the previous wheel, in spite of its very short axial length. That ledge also affords this wheel a notable advantage on mounting of a tire, because the outer bead can easily cross that ledge in a single operation. That also facilitates good placement of the bead on the outer seat. Finally, on demounting, it is observed that the stresses necessary to separate the beads from the seats and to make them drop into the mounting groove are very notably reduced. That makes it possible to reduce the risk of damage to the tire. Finally, on a manual demounting, it is not necessary to use a specific tool, in contrast to the wheels corresponding to EP 0 701 911 B1.

An embodiment of the invention is now described non-limitatively with the aid of the following attached drawings.

DESCRIPTION OF PREFERRED EMBODIMENTS

Figure 1:
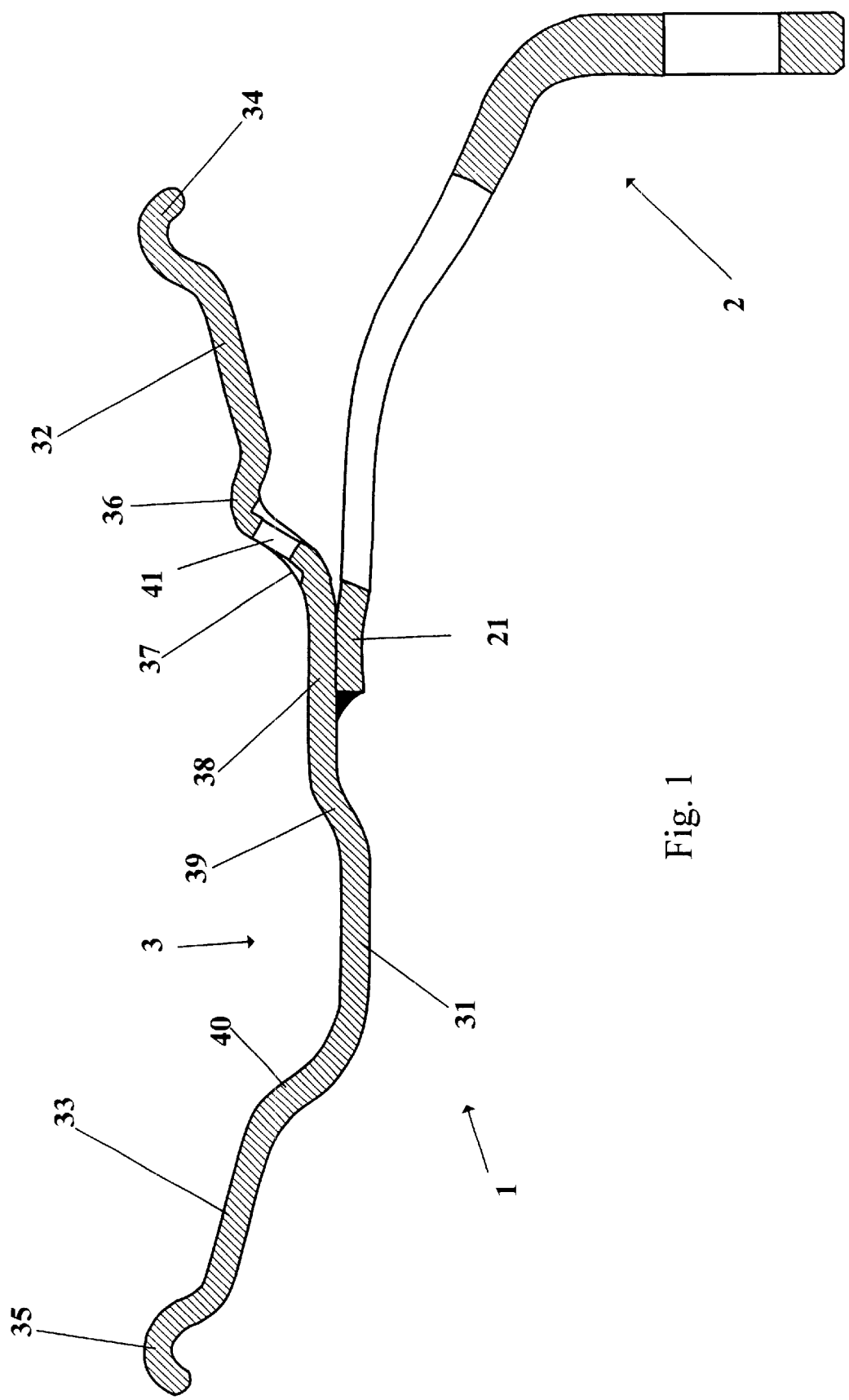
FIG. 1 is an axial section passing through the valve hole of a wheel described in patent EP 0 701 911 B1.

FIG. 1 presents a section of a sheet metal wheel 1, such as described in patent EP 0 701 911 B1.

That commercial vehicle wheel 1, of sheet steel and in a single piece, consists of a disk 2, of a rim 3 and of a valve (not represented). The rim 3 comprises a center mounting groove 31, two bead seats, outer side 32 and inner side 33, and two hooks 34 and 35. The seats are usually inclined at 15° relative to the axial direction. The groove 31 is joined to the seat 33 on the side opposite the disk 2 by a flange 40. On the side of the disk 2 (or outer side), from the inner end of the outer seat 32, there is a hump 36, a first connecting area 37, a second connecting area 38 and a flange 39 joined to the mounting groove 31. The disk-rim connection is made by welding of the end 21 of the disk 2 on the radially inner wall of the second connecting area 38. The valve hole 41 is situated between the hump 36 and the second disk/rim connecting area 39 in the wall of the first connecting area 37.

The hump diameter is, of course, greater than that of the inner end of the outer seat 32. This results, as previously explained, in some difficulties in mounting and demounting the tires intended to be mounted on that wheel.

Figure 2:
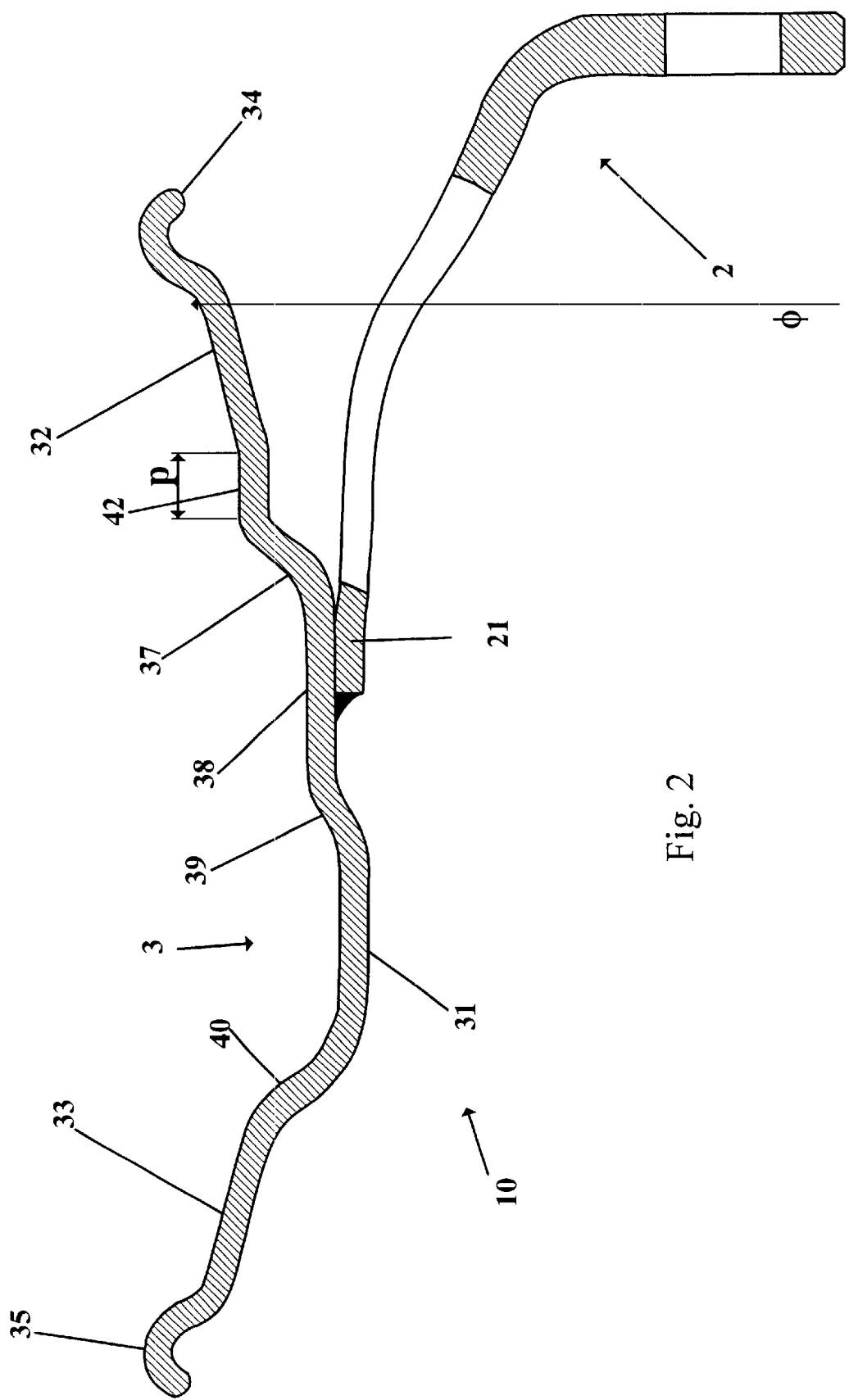
FIG. 2 is a similar section of an embodiment of a wheel according to the invention.

FIG. 2 shows a wheel 10 according to the invention. That wheel presents, from the inner end of the outer seat 32, a cylindrical wall or ledge 42 followed by a first connecting area 37 in which the valve hole is placed. The wall 42 can also be very slightly conical. There is then a second connecting area 38 followed by the outer flange 39 of the mounting groove 31. The second connecting area 38 is also the area of coupling of the disk to the rim. That area 38 is usually generally cylindrical, and it can also have a more or less marked conicity, which can reach about ten degrees relative to the axial direction. The axial length of that ledge is such that, $\Phi$ being the standardized diameter according to the ETRTO of the wheel, and p the axial length of the cylindrical wall 42, the result is:

$$10 \leq p/\Phi \times 1000 \leq 35$$

and preferably:

$$12 \leq p/\Phi \times 1000 \leq 26$$

That wheel also confirms, ø being the diameter of the radially outer wall of the ledge:

$$\emptyset/\Phi \geq 0.96$$

In the case of a wheel 22.5 inches in diameter, that is, 571.5 mm, those relations become: p ranges between 5.7 and 20 mm and preferably between 7 and 15 mm.

Those ledge lengths are very notably less than the ones usually applied for commercial vehicle wheels, the valve hole of which crosses the outer flange of the mounting groove, and which have a ledge as a safety element. The length of the ledge of such wheel is usually in the order of 30 to 60 mm for wheels 22.5 inches (571.5 mm) in diameter. The lengths recommended vary with the diameter of the wheel concerned.

The inclination of the rim seats according to the invention is also usually 15° relative to the axial direction.

Wholly unexpectedly, the use of a ledge in the dimensions thus provided afford an unseating prevention performance comparable to that of the previous wheels equipped with a hump.

To verify that performance, two tests were conducted with wheels according to the invention.

First test: After having mounted a tire dry on the wheel to be tested and inflated the mounted assembly to a given inflation pressure, the mounted assembly (wheel and tire) is set in place in the front lefthand position of a commercial vehicle, the load per axle of that truck being 6.6 tons for wheels 22.5 inches in diameter. The test is run on a concrete track 60 m in diameter. The vehicle enters the track at a speed of 50 km/h and covers two track revolutions at 40 km/h.

After those two revolutions, the test is considered positive if the tire remained on its rim. The inflation pressure of the tire is measured after the test.

The minimal inflation test pressures are 1.8 bars.

Wheels similar to those of FIG. 2, 22.5 inches in diameter, containing a cylindrical wall of variable length (40, 30, 20 and 13 mm), underwent that first test and all the wheels tested passed it successfully.

Second test: After having mounted a tire, the bead seats of which are lubricated in standard fashion on the wheel to be tested, and inflated the mounted assembly to a given inflation pressure, the mounted assembly (wheel and tire) is placed in the front right-hand position of a commercial vehicle. The test is run on a dry tar track of 20 m diameter. The vehicle enters the track and covers approximately ½ revolution at 40 km/h.

The test consists of gradually reducing the inflation pressure of the mounted assembly tested until obtaining unseating of the tire. The limiting inflating pressure having given rise to that unseating of the tire is registered. It is to be noted that the unseating of the tire takes place at the beginning of the circuit.

Table 1 gives the results obtained for wheels of 17.5×6.00 dimensions equipped with 8 R 17.5 tires.

| Wheel | Safety element | p/$\Phi$ × 1000 | $\emptyset/\Phi$ | Unseating pressure (bar) |
|---|---|---|---|---|
| 1 | Hump | — | — | 1.4 |
| 2 | Ledge | 22.5 | 0.97 | 1.2 |
| 3 | Ledge | 13.5 | 0.97 | 1.6 |

Taking into account the dispersion of the test, which is in the order of 0.2 bar, the unseating prevention performance of those three wheels is equivalent.

Complementary tests were also run with that test for 22.5×9.00 wheels according to the invention, equipped with tires of different tire makers. Comparison of the results obtained between those wheels and the wheels equipped with hump leads to the same conclusion as previously: the unseating prevention performances of the safety elements according to the invention and of the humps are wholly equivalent.

Figure 3:
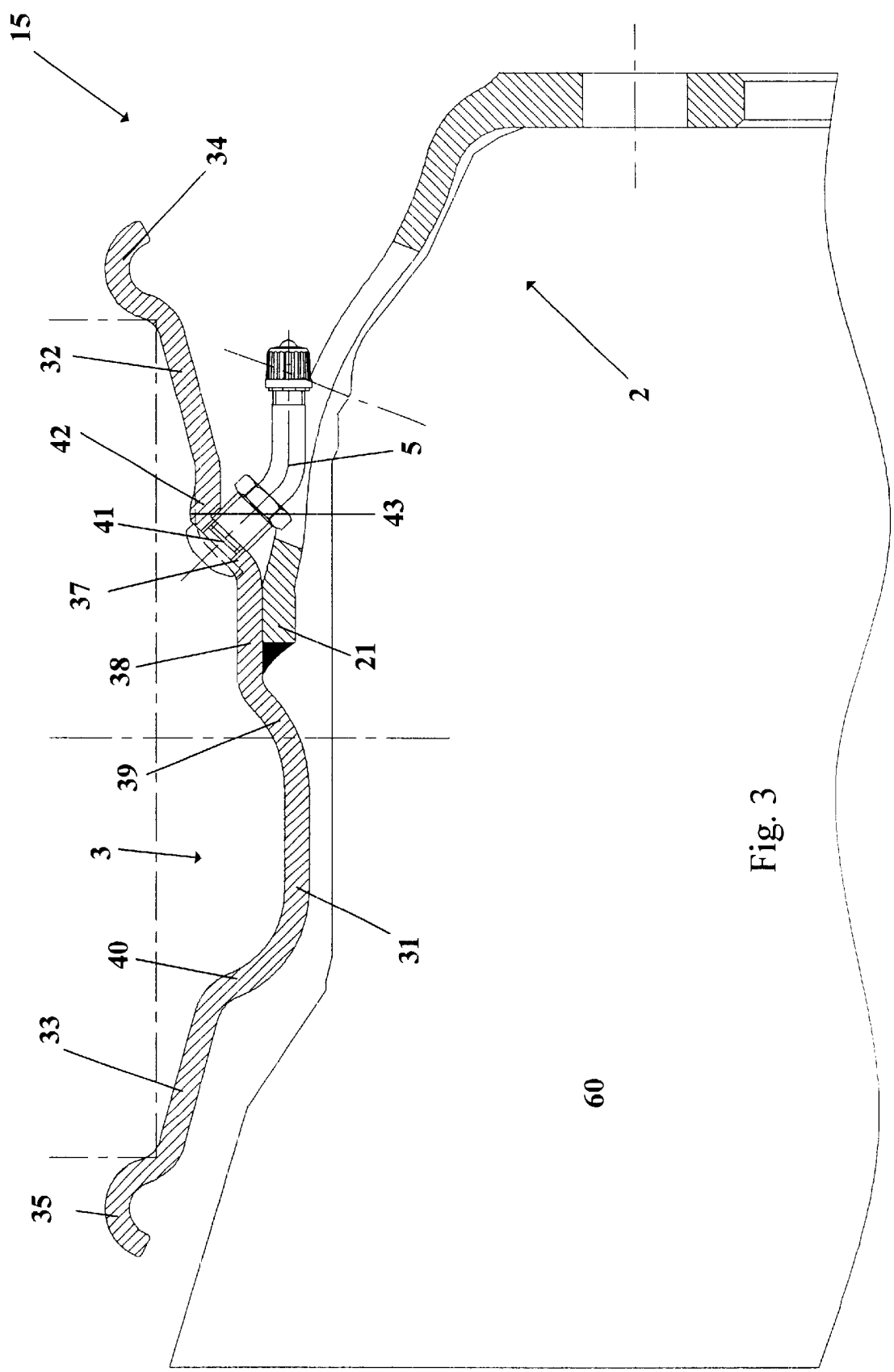
FIG. 3 is a section of a wheel similar to the wheel of FIG. 2 passing through the valve hole.

FIG. 3 presents a wheel 15 similar to the wheel 10 of FIG. 2. That section is made in the area of the valve 5. That area undergoes an operation of punching (or milling, etc.) of the flange 37 in order to obtain two flat walls on both sides of the valve hole necessary for maintaining good tightness on the internal cavity of the wheel. It is observed that this operation produces a localized deformation of the flange at the place of the valve hole, which results in the appearance of a protuberance of radial height slightly greater than that of the rest of the cylindrical wall. This extra thickness is, however, very localized and has no appreciable effect on the operations of mounting and demounting tires on that wheel. This FIG. 3 also illustrates the volume occupied by the brake parts 60 arranged in the interior space of the disk 2.

The wheels according to the invention can be made of sheet steel or aluminum. The range of application of these wheels corresponds to wheels of width greater than or equal to 5.25 inches (133.5 mm). In fact, with wheels of lesser width, it becomes difficult to provide sufficient room to place the valve in the available space of the flange 37.

We claim:

1. A wheel for a commercial vehicle, the wheel being made of sheet metal, comprising:

a disk, and a rim with an outer hook, an outer seat, a safety element, a first connecting area in which a valve hole is disposed, a second connecting area, a circumferential mounting groove with an outer flange and an inner flange, an inner seat and an inner hook, the connection between said disk and said rim being made in said second connecting area, the diameter of which is greater than that of said mounting groove, characterized in that said safety element is a cylindrical wall or ledge of diameter identical to that of the inner end of said outer seat and in that, $\Phi$ being the diameter of said wheel and p the axial length of said cylindrical wall:

$$10 \leq p/\Phi \times 1000 \leq 35.$$

2. A wheel according to claim 1 in which:

$$12 \leq p/\Phi \times 1000 \leq 26.$$

3. A wheel according to claim 1 in which ø being the diameter of the radially outer wall of the ledge:

$$\text{ø}/\Phi \leq 0.96.$$

4. A wheel according to claim 1 in which the inclination of the rim seat is 15° relative to the axial direction.

5. A wheel according to claim 1 in which the width of said wheel is greater than or equal to 5.25 inches (133.5 mm).

* * * * *

UNITED STATES PATENT AND TRADEMARK OFFICE
CERTIFICATE OF CORRECTION

PATENT NO.    : 6,450,226 B2
DATED         : September 17, 2002
INVENTOR(S)   : DeLacroix et al.

It is certified that error appears in the above-identified patent and that said Letters Patent is hereby corrected as shown below:

<u>Title page,</u>
Item [75], Inventor(s), "Chamalieres" should read -- Clermont-Ferrand --

<u>Column 6,</u>
Line 1, "$ø/Φ ≤ 0.96$" should read -- $ø/Φ ≥ 0.96$ --

Signed and Sealed this

Twenty-second Day of July, 2003

JAMES E. ROGAN
*Director of the United States Patent and Trademark Office*